(12) United States Patent
Shiuh et al.

(10) Patent No.: US 6,653,255 B2
(45) Date of Patent: *Nov. 25, 2003

(54) HIGHLY PURIFIED BIOGENIC SILICA PRODUCT

(75) Inventors: Jerome C. Shiuh, Lompoc, CA (US); Scott K. Palm, Santa Maria, CA (US); Timothy R. Smith, Lompoc, CA (US); George A. Nyamekye, Lompoc, CA (US); Jeffrey D. Taniguchi, Santa Maria, CA (US); Qun Wang, Lompoc, CA (US)

(73) Assignee: Advanced Minerals Coroporation, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,879

(22) Filed: May 2, 2001

(65) Prior Publication Data

US 2001/0023233 A1 Sep. 20, 2001

Related U.S. Application Data

(63) Continuation of application No. 08/908,704, filed on Aug. 8, 1997, now abandoned, which is a continuation of application No. 08/514,272, filed on Aug. 11, 1995, now Pat. No. 5,656,568.

(51) Int. Cl.$^7$ ................................................ B01J 20/14
(52) U.S. Cl. ............................................... 502/412
(58) Field of Search ................................. 423/335, 340; 502/412

(56) References Cited

U.S. PATENT DOCUMENTS

| | | |
|---|---|---|
| 665,652 A | 1/1901 | Enzinger |
| 1,606,281 A | 11/1926 | Williams |
| 1,934,410 A | 11/1933 | Cummins |
| 1,992,547 A | 2/1935 | Schuetz |
| 2,504,357 A | 4/1950 | Swallen |
| 2,693,456 A | 11/1954 | Fennell |
| 2,701,240 A | 2/1955 | Bregar |
| 3,375,922 A | 4/1968 | Martin et al. |
| 3,547,260 A | 12/1970 | Munn |
| 3,572,500 A | 3/1971 | Kouloheris |
| 4,134,857 A | 1/1979 | Bradley et al. |
| 4,142,968 A | 3/1979 | Nielsen et al. |
| 4,187,174 A | 2/1980 | Nielson et al. |
| 4,325,844 A | 4/1982 | Olmsted, Jr. |
| 4,980,334 A | 12/1990 | Brennan |
| 5,009,906 A | 4/1991 | Smith |
| 5,122,112 A | 6/1992 | Jones |
| 5,179,062 A | 1/1993 | Dufour |
| 5,656,568 A | 8/1997 | Shiuh et al. |

FOREIGN PATENT DOCUMENTS

| | | |
|---|---|---|
| AU | 86/62120 | 3/1987 |
| AU | 638655 | 7/1993 |
| BR | 9102509 | 1/1992 |
| CA | 890249 | 1/1972 |
| CA | 2044868 | 12/1991 |
| CN | 86-1-07500 | 9/1987 |
| CN | 1044233 | 8/1990 |
| CN | 1053564 | 8/1991 |
| CZ | 128699 | 8/1968 |
| CZ | 128894 | 8/1968 |
| DE | 286240 | 12/1915 |
| DE | 469606 | 2/1927 |
| DE | 570015 | 6/1931 |
| DE | 730034 | 12/1942 |
| DE | 1005048 | 3/1957 |
| DE | 1052964 | 3/1959 |
| DE | 4120242 | 1/1992 |
| DK | 9101179 | 12/1991 |
| FR | 377086 | 4/1907 |
| FR | 2663564 | 12/1991 |
| GB | 5379 | of 1907 |
| GB | 341060 | 2/1931 |
| GB | 2245265 | 2/1994 |
| IT | 487158 | 11/1953 |
| IT | 529036 | 6/1955 |
| JP | 33-4414 | 6/1958 |
| JP | 33-10780 | 12/1958 |
| JP | 46-7563 | 2/1971 |
| JP | 01-153564 | 6/1989 |
| JP | 06-315368 | 11/1994 |
| NL | 9101057 | 1/1992 |
| RU | 59337 | 3/1941 |

OTHER PUBLICATIONS

Baly, E.C.C. et al. (1939). "Adsorption of the Hydrous Metallic Oxides by Kieselguhr," *Trans. Faraday Soc.* 35:1165–1175 (also provided, abstract from Chemical Abstracts, 1939, vol. 33, col. 9084–9085).

Bear, J. (1988). "The Equation of Motion of a Homogenous Fluid: Derivations of Darcy's Law," Chapter 5, Section 9, 2nd Edition *In Dynamics of Fluids in Porous Media*. Dover Publications, Inc.: New York, NY., pp. 161–177.

Breese, R.O.Y. (1994). "Diatomite," *In Industrial Minerals and Rocks.* 6th Edition, Donald D. Carr et al., eds., Society for Mining, Metallurgy, and Exploration, Inc.: Littleton, Colorado, pp. 397–412.

Brozek, M. et al. (1992). "Enrichment of Carpathian Diatomites by the Flotation–Chemical Method," *Przegl. Gorn.* 48(7):16–20 (in Polish with English translation).

(List continued on next page.)

*Primary Examiner*—Stuart L. Hendrickson
(74) *Attorney, Agent, or Firm*—Morrison & Foerster LLP

(57) ABSTRACT

This invention relates to highly purified biogenic silica product obtained from diatomite and methods for preparing same. More particularly, this invention pertains to highly purified non-calcined, calcined, and flux-calcined diatomite products which bear the distinguishing porous and intricate structure of silica unique to diatomite and which have an extraordinarily high silica (i.e., silicon dioxide, $SiO_2$) content and low density, resulting in high silica specific volume. These products often also exhibit exceptionally low soluble metals content and/or extreme brightness.

22 Claims, 2 Drawing Sheets

OTHER PUBLICATIONS

Cai, H. et al. (1992). "Experimental Reserach on Purification of Sichuan Miyi Diatomite," *Kuangchan Zonghe Liyong* 1992(6):1–8 (in Japanese with English abstract from Chemical Abstracts, 1994, vol. 120, p. 223, 110820w).

CECA S.A. (1988). "Adjuvants of Filtration," (12 pages total).

Celite Corporation. (1991). "Acid Washed Filter Aids" Publication FA–488 3/91 (2 pages).

Celite Corporation. (1991). "Celite Filter Aids for Maximum Clarity at Lowest Cost" Publication FA–84 8/91, pp. 1–28.

CR Minerals Corporation. (no date). "DiaFil" (22 pages total).

Eagle–Picher Minerals, Inc. (1988). "Celatom: Filtration with Diatomite Filter Aids" Publication Form A–550 (17 pages total).

Engh, K.R. (1994). "Diatomite," *In Kirk–Othmer Encyclopedia of Chemical Technology*. 4th Edition, vol. 8, John Wiley & Sons: New York, NY., pp. 108–118.

Filho, F.X.H. and Da Veiga, M.M. (1980). "Processing of Diatomite from Canavieira in the State of Ceará," *Mineração Metalurgia* 44(424):14–21 (in Portuguese with English translation).

Govindaraju, K. (Jul., 1989). "1989 Compilation of Working Values and Sample Description for 272 Geostandards," *Geostandards Newsletter* 13:1–9 (with excerpts from Appendices I–IV).

Grefco, Inc. (1990). "Dicalite: High Performance Filter Acids" *Filtration Bulletin* B–16 R2–90 (15 pages total).

Gruder, G. et al. (1958). "Beneficiation of Some Natural Materials by the Electrochemical Method. Communication I. Diatomites and Kaolins," *Rev. Chim. (Bucharest)* 9(7–8):361–366 (in Romanian with English translation).

Hermanson, G.T. et al. (1992). "The Matrix," Chapter 1 *In Immobilized Affinity Ligand Techniques*. Academic Press, Inc.:San Diego, CA., pp. 11–14.

Heyse, K.U. and Feigi, R. (1980). "The Solubility in Beer of Iron from Filter Materials and their Influence in Practice," *Brauwissenschaft* 33(6):137–143 (in German with English abstract at p. 142).

Kainer, F. (1951). *Kieselgur ihre Gewinnung, Veredulung Und Andwendung*. Verlag Von Ferdinand Enke In Stuttgart (publisher), pp. 50–53 and 70–76 (in German with English language translation attached).

Kiefer, J. (1991). "Kieselguhr Filtration: Overview of Theoretical Principles," *Brauwelt International* 4:300–309.

Krishtofovich, A.N., ed. (1955). *Dictionary of Geology*. vol. 1, Moscow, p. 219 (translation of the relevant part thereof attached).

Li, F. (1990). "Study of Kieselguhr Purification by Acid Processing," *Feijinshukuang* 1989(3):27–28 and 43 (in Japanese with English abstract from Chemical Abstracts, 1990, vol. 112, p. 179, 182335z).

Marcus, D. (1967). "Studies on the Deferrization of Some Diatomites and the Quality of the Products Obtained," *Rev. Chim. (Bucharest)* 18(6):332–335 (in Romanian with English translation).

Marcus, D. and Creanga, L. (1964). "Obtaining Higher Grades of Diatomite for Filtering and Filling," *Rev. Chim. (Bucharest)* 15(11):671–674 (in Romanian with English translation).

*Methods of Analysis of the American Society of Brewing Chemists*. 7th Edition, Am. Soc. Brewing Chemists: St. Paul, MN "Beer–18:Iron", pp. 1–5.

Moll, M. (1987). *Analytica–EBC of the European Brewery Convention*. 4th Edition, Brauerei– Und Getränke–Rundschau CH–8047: Zurich, Switzerland, pp. E255–E258.

Norman, J. et al. (May 1940). "Purification of Diatomite by Froth Flotation," *Mining Technology*, pp. 1–11.

Showa Chemical Industry Co., Ltd. (1995). "Properties of Radiolite–Based Filtration Assisting Agents," Publication 95.1.2000(3) (8 pages in Japanese with English translation).

Tarhanič, L. and Kortišová. (1979). "Processing Diatomaceous Earth from the Močiar Deposit in Heavy Suspensions," *Geologicky Priezkum* 21(5):140–142 (in Czechoslovakian with English translation).

Videnov, N. et al. (1993). "Beneficiation of Diatomites by High Gradient Magnetic Separation," *Inter. J. Miner. Process.* 39:291–298.

Wang, S. (1992). "Comprehensive Utilization of Lake Diatomite and Study on Its Thermal Flotation Technique," *Feijinshukuang* (3):10–13 (in Chinese with English translation of abstract).

English Abstract of SU 931714 entitled "Process for Producing Adsorbent Based on Diatomite," by Sonya A. Melikyan. (Copy of patent in Russian attached).

English Abstract of SU 1599055 entitled "Method of Producing Filtering Material Based on Diatomite," by Otar M. Mdivnishvili and Lamara Ya Uridiya. (Copy of patent in Russian attached).

Bye, E. et al., (1984). "In Vitro Cytotoxicity and Quantitative Silica Analysis of Diatornaceous Earth Products," *British J. of Industrial Medicine* 41:228–234.

HIGHLY PURIFIED BIOGENIC SILICA PRODUCT

This application is a continuation of abandoned U.S. patent application Ser. No. 08/908,704, filed Aug. 8, 1997, which in turn is a continuation of U.S. patent application Ser. No. 08/514,272, filed Aug. 11, 1995, now U.S. Pat. No. 5,656,568, issued Aug. 12, 1997, the disclosures of which are incorporated herein by reference in their entirety.

TECHNICAL FIELD

This invention relates to a highly purified biogenic silica product obtained from diatomite and methods for preparing same. More particularly, this invention pertains to a highly purified biogenic silica product which bears the distinguishing porous and intricate structure of silica unique to diatomite and which has an extraordinarily high silica (i.e., silicon dioxide, $SiO_2$) content and low density, resulting in a high silica specific volume. The present invention also pertains to modified highly purified biogenic silica products having exceptionally low content of soluble metals and/or extreme brightness.

BACKGROUND

Throughout this application, various publications, patents, and published patent applications are referred to by an identifying citation; full citations for these documents may be found at the end of the specification immediately preceding the claims. The disclosures of the publications, patents, and published patent specifications referenced in this application are hereby incorporated by reference into the present disclosure to more fully describe the state of the art to which this invention pertains.

The present invention relates to purified diatomite products which both retain the intricate and porous structure unique to diatomite (i.e., which have an intricate and porous diatomaceous silica structure), and have a unique combination of special physical and chemical properties (such as, for example, high purity, low density, low soluble impurity content, low total impurity content, and high brightness). The unique combination of special properties offered by the highly purified diatomite products of the present invention (which permit, inter alia, improved efficiency and economy) are not offered by other known diatomite products.

Currently, diatomite products are used in a wide variety of applications, including, but not limited to, separation, adsorption, support, and functional filler applications. Recent reviews (Breese, 1994; Engh, 1994) provide particularly useful introductions to the properties and uses of diatomite. The purified diatomite products of the present invention have both the intricate and porous structure unique to diatomite silica and exceptional purity, and therefore permit greatly increased effectiveness in many of these applications.

Diatomite products are obtained from diatomaceous earth (also known as kieselguhr), which is a sediment enriched in biogenic silica (i.e., silica produced or brought about by living organisms) in the form of the siliceous frustules (i.e., shells or skeletons) of diatoms. Diatoms are a diverse array of microscopic, single-celled golden brown algae of the class Bacillariophyceae, which possess an ornate siliceous skeleton (i.e., frustule) of varied and intricate structure consisting of two valves which, in the living diatom, fit together much like a pill box. The morphology of the frustules varies widely among species and serves as the basis for taxonomic classification; over at least 2,000 distinct species are known. The surface of each valve is punctuated by a series of openings that comprise the complex fine structure of the frustule and impart a design that is distinctive to individual species. The size of typical frustules ranges from 0.75 to 1,000 $\mu$m, although the majority are in the range of 10 to 150 $\mu$m. These frustules are sufficiently durable to retain much of their porous and intricate structure virtually intact through long periods of geologic time when preserved in conditions that maintain chemical equilibrium.

The fundamental chemical composition and the intricate and porous structure of the diatom frustule give diatomite unique commercial value and versatility unmatched by other natural forms of silica in, for example, filtration and filler applications. The fine particulate structure of the diatom skeleton imparts low density and high surface area, as well as high porosity and permeability.

Diatomite products may be manufactured by a variety of methods and from numerous resources, offering diversity in both physical and chemical characteristics.

In the field of filtration, many methods of particle separation from fluids employ diatomite products as filter aids. The intricate and porous structure unique to diatomite silica is particularly effective for the physical entrapment of particles in filtration processes. It is common practice to employ diatomite products when improving the clarity of fluids that contain suspended particles or particulate matter, or have turbidity.

Diatomite products are often applied to a septum to improve clarity and increase flow rate in filtration processes, in a step sometimes referred to as "precoating." Diatomite is also often added directly to a fluid as it is being filtered to reduce the loading of undesirable particulate at the septum while maintaining a designed liquid flow rate, in a step often referred to as "body feeding." Depending on the particular separation involved, diatomite products may be used in precoating; body feeding, or both. The principles involved with diatomite filtration have been reviewed (Kiefer, 1991).

In some filtration applications, different diatomite products are blended together to further modify or optimize the filtration process. Also, diatomite products are sometimes combined with other substances. In some cases, these combinations may involve simple mixtures, for example, with cellulose, activated charcoal, clay, or other materials. In other cases, these combinations are composites in which diatomite products are intimately compounded with other ingredients to make sheets, pads, or cartridges. Still more elaborate modifications of any of these diatomite products are used for filtration or separation, involving, for example, surface treatment and the addition of chemicals to diatomite products, mixtures, or their composites.

In certain circumstances, diatomite products may also exhibit unique adsorptive properties during filtration that can greatly enhance clarification or purification of a fluid. These adsorptive properties are highly specific, and depend upon weak forces for attraction of the adsorbed species to weak electrical charges at the surface of diatomite, or upon the reactivity of silanol (i.e., $\equiv$Si—OH) functional groups that often occur at the diatomite surface. For example, an ionized silanol group (i.e., $\equiv$Si—O) may react with a hydronium ion (i.e., $H_3O^+$) contributed by an acidic substance in solution, for example, citric acid (i.e., $C_6H_8O_7$), adsorbing the donated $H^+$ at the surface in the process.

The intricate and porous structure of silica unique to diatomite products also permits their commercial use to provide antiblock properties to polymers. Diatomite products are often used to alter the appearance or properties of paints, enamels, lacquers, and related coatings and finishes. In addition to their use in paper or cellulose-bearing filter media, diatomite products are used commercially in paper processing applications, and they are essential to the processing of certain commercial catalysts. Diatomite products are also used as chromatographic supports, and are especially suited to gas-liquid chromatographic methods.

Regardless of the manner in which a diatomite product is used in separating particles from fluids, the diatomite product must make contact with the fluid from which particles are being removed. As ingredients in polymers, plastics, paints, coatings, and other formulations, the diatomite product also comes into contact with most of the other ingredients in the formulation. For this reason, high silica purity and low solubility of impurities in the diatomite product are often highly desirable properties. In addition, the efficiency and usefulness of a diatomite product used as a filter aid is also related to its density when in contact with fluid during filtration operation. In most instances, a diatomite product with low density is highly desirable.

The highly purified diatomite products of the present invention, and their further modifications, are useful in numerous other applications. As the effectiveness of diatomite in its applications is generally related to the presence of the porous and intricate structure of silica unique to diatomite in combination with high silica purity, the highly purified diatomite products of the present invention offer these distinguishing characteristics in greater degree than heretofore possible.

DISCLOSURE OF THE INVENTION

One aspect of the present invention provides a highly purified diatomite product having an intricate and porous diatomaceous silica structure, said product selected from the group consisting of: a non-calcined product having a silica specific volume greater than 3.5; a calcined product having a silica specific volume greater than 3.6; and a flux calcined product having a silica specific volume greater than 3.3. In a preferred embodiment, the non-calcined product has a total silica content of greater than 95% (w/w) $SiO_2$ on an ignited basis; the calcined product has a total silica content of greater than 98% (w/w) $SiO_2$ on an ignited basis; and, the flux calcined product has a total silica content of greater than 92% (w/w) $SiO_2$ on an ignited basis. In a preferred embodiment, the product has a beer-soluble aluminum content of less than 10 mg Al/kg product. In another preferred embodiment, the product has a beer-soluble iron content of less than 7 mg Fe/kg product.

Another aspect of the present invention provides a highly purified non-calcined diatomite product having an intricate and porous diatomaceous silica structure, said product having a silica specific volume greater than 3.5. In a preferred embodiment, the non-calcined product has a total silica content of greater than 95% (w/w) $SiO_2$ on an ignited basis. In another preferred embodiment, the non-calcined product has a beer-soluble aluminum content of less than 10 mg Al/kg product. In yet another preferred embodiment, the non-calcined product has a beer-soluble iron content of less than 7 mg Fe/kg product. In still another preferred embodiment, the product has a specific resistance greater than 50 k$\Omega$-cm.

Another aspect of the present invention provides a highly purified calcined diatomite product having an intricate and porous diatomaceous silica structure, said product having a silica specific volume greater than 3.6. In a preferred embodiment, the calcined product has a total silica content of greater than 98% (w/w) $SiO_2$ on an ignited basis. In another preferred embodiment, the calcined product has a beer-soluble aluminum content of less than 10 mg Al/kg product. In yet another preferred embodiment, the calcined product has a beer-soluble iron content of less than 7 mg Fe/kg product. In still another preferred embodiment, the calcined product has a specific resistance greater than 80 k$\Omega$-cm. In yet another preferred embodiment, the calcined product has a blue light reflected brightness of greater than 96%.

Another aspect of the present invention provides a highly purified flux calcined diatomite product having an intricate and porous diatomaceous silica structure, said product having a silica specific volume greater than 3.3. In a preferred embodiment, the flux calcined product has a total silica content of greater than 92% (w/w) $SiO_2$ on an ignited basis. In another preferred embodiment, the flux calcined product has a beer-soluble aluminum content of less than 10 mg Al/kg product. In yet another preferred embodiment, the flux calcined product has a beer-soluble iron content of less than 7 mg Fe/kg product. In still another preferred embodiment, the flux calcined product has a blue light reflected brightness of greater than 95%. In yet another preferred embodiment, the flux calcined product has a combined total sodium ($Na_2O$) content and total silica ($SiO_2$) content of greater than 98% (w/w) on an ignited basis.

Another aspect of the present invention provides a highly purified diatomite product having an intricate and porous diatomaceous silica structure, said product having a blue light reflected brightness greater than 99%.

MODES FOR CARRYING OUT THE INVENTION

A. Highly Purified Biogenic Silica Product

Figure 1:
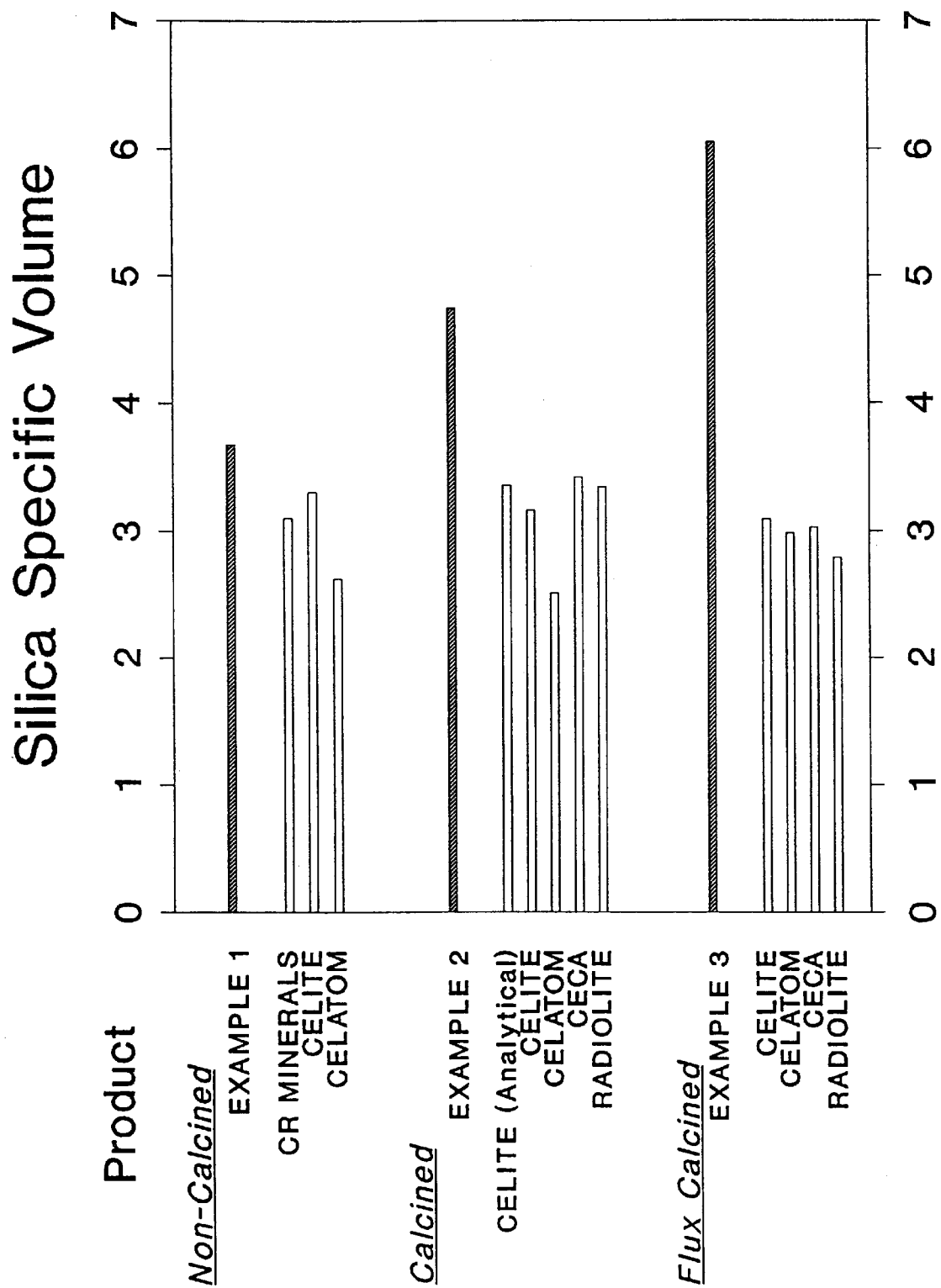
FIG. 1 is bar graph illustrating data for the silica specific volume for various silica products, as presented in Table 1, Part C.

The highly purified diatomite products of the present invention have extraordinarily high silica content. In addition to the high silica content, these products also retain the intricate and porous structure that is characteristic of diatomite (i.e., these products have an intricate and porous diatomaceous silica structure), which is essential in many applications for the diatomite product to be effective. This unique combination of properties results in, inter alia, a desirable low centrifuged wet density, which further results in a high silica specific volume, exceeding that of any previously known diatomite product.

The purified diatomite product of the present invention has low density in conjunction with low impurity solubility, which allows for increased capacity, flow, clarity, or occupancy per unit of weight in spatially limited applications, while significantly reducing the contribution of undesirable aluminum, iron, and other elements from the diatomite product to the contacted material. For many of the applications of diatomite, the highly purified diatomite products of the present invention thus provide improved purity as well as improved economy of use, at levels substantially beyond that which is currently available.

The highly purified diatomite products of the present invention may conveniently be described as non-calcined, calcined, or flux calcined, according to how the product was prepared. These broad classes reflect the method of preparation employed, which controls the permeability of the product by moderating the degree to which agglomeration and sintering occurs, which is of general importance to the useful application of the highly purified diatomite products.

As used herein, the term "non-calcined product" refers to a product which has not been subjected to calcination or flux calcination. As used herein, the term "calcined product" refers to a product which has been subjected to calcination. Typical calcination procedures and parameters are described in the Methods presented below. As used herein, the term "flux calcined product" refers to a product which has been subjected to flux calcination (i.e., calcination in the presence of a flux). Typical fluxes are described in the Methods presented below.

The composition and properties of the highly purified diatomite products of the present invention, as well as those of known diatomite products, are described in detail below.

1. Permeability

For use in filtration, diatomite pro ducts are usually processed to provide a range of filtration rates, which are closely related to their permeability. Permeability, reported in units of Darcies, commonly abbreviated "Da," is readily determined (European Brewery Convention, 1987) using a specially constructed device designed to form a filter cake on a septum from a suspension of diatomite in water, and then measuring the time required for a specified volume of water to flow through a measured thickness of filter cake of known cross-sectional area. The principles have been previously derived for porous media from Darcy's law (Bear, 1972), so an array of alternative devices and methods are in existence that correlate well with permeability. Diatomite filter aids that are currently commercially available span a wide range of permeability, from about 0.001 to about 30 Da. The selection of a filter aid with a particular permeability suitable for a specific filtration process depends on the flow rate and degree of fluid clarification desired for the particular application.

The highly purified diatomite products of the present invention have a spectrum of permeabilities comparable to the range offered by the diatomite filter aids that are currently available commercially. The non-calcined highly purified diatomite products of the present invention have permeabilities of less than about 0.1 Da (usually in the range of about 0.001 to about 0.1 Da). The calcined highly purified diatomite products of the present invention have permeabilities in the range of about 0.05 to about 1.5 Da. The flux calcined highly purified diatomite products of the present invention have permeabilities of more than about 1 Da (usually in the range of about 1 to about 50 Da).

2. Solubility of Iron/Aluminum

Large volumes of conventional diatomite products are used to filter liquids, for example, beer. Contamination of the filtered beer with metals, such as iron (i.e., Fe, as the ions $Fe^{2+}$ and/or $Fe^{3+}$) or aluminum (i.e., Al, as the ion $Al^{3+}$) is a key concern. Consequently, the contents of iron or aluminum in the diatomite product which are soluble in beer (e.g., beer-soluble iron, beer-soluble aluminum) provide useful indicators of the degree to which contamination by these impurities occurs. For example, the majority of conventional diatomite filter aids used in beer filtration have beer-soluble iron contents from approximately 7 mg Fe/kg product to approximately 50 mg Fe/kg product, depending on the filter aid selected.

A reliable analytical method has been established in the industry to determine the solubility of iron from diatomite products in beer (American Society of Brewing Chemists, 1987). The preferred analytical method for highly purified diatomite products involves a calibrated colorimetric method employing 1,10-phenanthroline (i.e., o-phenanthroline, $C_{12}H_8N_2$). If the sample to be tested is a non-calcined product, the sample should be dried to constant weight at 110° C. in air, and subsequently allowed to cool to room temperature in air (i.e., dried). If the sample to be tested is a calcined or flux calcined product, the sample should be dried to constant weight at room temperature in air. A 5 g sample is added to 200 mL of decarbonated beer (in this case, BUDWEISER, registered trademark of Anheuser-Busch) at room temperature, and the mixture swirled intermittently for an elapsed time of 5 min and 50 sec. The mixture is then immediately transferred to a funnel containing 25 cm diameter filter paper, from which the filtrate collected during the first 30 sec is discarded. Filtrate is collected for the next 150 sec, and a 25 mL portion is treated with approximately 25 mg of ascorbic acid (i.e., $C_6H_8O_6$), to reduce dissolved iron ions to the ferrous (i.e., $Fe^{2+}$) state (thus yielding "sample extract"). The color is developed by addition of 1 mL of 0.3% (w/v) 1,10-phenanthroline, and, after 30 min, the absorbance of the resulting sample solution is compared to a standard calibration curve. The calibration curve is prepared from standard iron solutions of known concentration in beer. Untreated filtrate is used as a method blank to correct for turbidity and color. Absorbance is measured at 505 nm using a spectrophotometer, in this case, a Milton & Bradley Spectronic.

The highly purified diatomite products of the present invention have beer-soluble iron contents of less than about 7 mg Fe/kg product (usually in the range of from about the quantitation limit to about 7 mg Fe/kg product), more preferably less than about 5 mg Fe/kg product (usually in the range of from about the quantitation limit to about 5 mg Fe/kg product). The quantitation limit (i.e., detection limit) is approximately 2 mg Fe/kg product.

The preferred method for determining the solubility of aluminum from diatomite products in beer uses inductively-coupled argon plasma emission spectrophotometry (ICP). Sample extracts are prepared according to the American Society of Brewing Chemists method for Deer (as described above for iron), and diluted with 2% (v/v) nitric acid in deionized water to a concentration of 20% (v/v) beer. This dilution is necessary to optimize sensitivity while maintaining plasma stability. Data reported here for the analysis of the diluted extract solutions were collected using a Baird Model PSX sequential ICP spectrophotometer capable of operating in multiple spectroscopic orders from 160 nm to 800 nm. The unit is equipped with a thermostatted 0.75 m modified Czerny-Turner monochromator (Acton Research Corporation Model L-507) evacuated to 8.5 Pa (≈65 millitorr) and employs a crystal-controlled oscillator which generates a radio frequency of 40.68 MHz, and produces a plasma at a concentric fused silica torch assembly by applying 700 W forward power (for the analyses presented here) with less than 0.5 W of power being reflected. Welding-grade liquid argon was used for the primary plasma, and was delivered through a mass flow controller (Emerson Electric Company, Brooks Instrument Division Model 5876) at approximately 46 relative units. An argon purge was supplied to the interface optics at 4.0 relative units as measured with a Matheson rotameter. Wavelengths were selected using a sine bar mechanism, with absolute reference wavelengths established at the grating edge of 160.000 nm and at the primary standard argon emission wavelength of 415.859 nm. Aluminum was determined at the first order 396.152 nm spectral line. Spectral interferences from calcium, vanadium, and manganese were previously evaluated for this line and determined to be insignificant. Intensities for sample solutions were compared with those for a series of standards prepared in beer from commercial aluminum standard reference solutions (Spex Industries, Inc.).

The highly purified diatomite products of the present invention have beer-soluble aluminum contents of less than about 10 mg Al/kg product (usually in the range of from about the quantitation limit to about 10 mg Al/kg product), more preferably less than about 8 mg Al/kg product (usually in the range of from about the quantitation limit to about 8 mg Al/kg product). The quantitation limit (i.e., detection limit) is approximately 2 mg Al/kg product.

3. Specific Resistance

Since diatomite products are in intimate contact with a fluid being filtered, or come into intimate contact with other ingredients in formulated products, an even more general measure of soluble ions is obtained by measuring the specific resistance (i.e., resistivity) of a 10% (w/v) suspension of a diatomite product in deionized water. Deionized water is a very poor conductor of electricity, so introduction of soluble ions (i.e., from the diatomite product) decreases the high specific resistance of pure water. Diatomite products that impart a low specific resistance when slurried with deionized water contribute more undesirable soluble ions to the slurry. In many cases, the presence of certain soluble monovalent ions of the alkali metal Group IA in the periodic chart (for example, potassium, $K^+$, and particularly sodium, $Na^+$) have little effect on the usefulness of the high purity diatomite product. However, other, usually multivalent, ions (for example, iron, $Fe^{2+}$ and/or $Fe^{3+}$; and aluminum, $Al^{3+}$) have greater impact on the usefulness of the high purity diatomite product.

Specific resistance data for the highly purified diatomite products of the present invention can be obtained using a conductivity cell. If the sample to be tested is a non-calcined product, the sample should be dried to constant weight at 110° C. in air, and subsequently allowed to cool to room temperature in air (i.e., dried). If the sample to be tested is a calcined or flux calcined product, the sample should be dried to constant weight at room temperature in air. A 10 g sample is added to a 250 mL beaker containing 100 mL of distilled or deionized water with a minimum specific resistance of 1 MΩ-cm (i.e., 10% w/v). The mixture is swirled for 15 sec to fully suspend the slurry, then allowed to settle. The mixture is swirled again after 15 min, and allowed to settle for not less than 1 hr. The supernatant is decanted into a cell tube, and a conductivity cell (Cole Parmer EC Meter Model 1481-61) dipped into the liquid. The cell is moved up and down several times to release any air bubbles trapped in the cell, and the resistivity measured using the conductivity bridge contained within the meter. The conductivity cell is calibrated (to obtain a cell calibration constant) with solutions of known specific resistance. The corrected specific resistance is determined from the measured resistivity and the calibration constant.

The non-calcined highly purified diatomite products of the present invention offer specific resistances of greater than about 50 kΩ-cm (usually in the range of about 50 kΩ-cm to about 250 kΩ-cm), more preferably greater than about 60 kΩ-cm (usually in the range of about 60 kΩ-cm to about 250 kΩ-cm). The calcined highly purified diatomite products of the present invention have specific resistances of greater than about 80 kΩ-cm (usually in the range of about 80 kΩ-cm to about 500 kΩ-cm), more preferably greater than about 130 kΩ-cm (usually in the range of about 130 kΩ-cm to about 500 kΩ-cm).

4. Reflected Brightness

In many instances, especially in filler applications, diatomite products have greater utility if they have a high reflected brightness. A preferred method for determining reflected brightness involves measuring the amount of blue light reflected from a smooth surface of the product, as determined using a special instrument that provides a source of illumination, a blue filter, and a detector (Photovolt Brightness Meter, Model 575). The instrument is calibrated using standard plates of known reflectance in blue light, after the lamp has been turned on and its emission output has stabilized. If the sample to be tested is a non-calcined product, the sample should be dried to constant weight at 110° C. in air, and subsequently allowed to cool to room temperature in air (i.e., dried). If the sample to be tested is a calcined or flux calcined product, the sample should be dried to constant weight at room temperature in air. A plastic plate having a depression machined into it is slightly overfilled with the sample, which is then compressed with a smooth-faced plate using a circular pressing motion. The smooth-faced plate is carefully removed with a sliding motion to insure an even, unmarred surface. The sample is then placed at the instrument's sample port with the blue filter in place. The reflectance measurement is then read directly from the instrument. Blue light reflectance can also be calculated from measurements of brightness obtained using other instruments, for example, those available from Hunter or CIE (Commission Internationale de l'Éclairage).

The calcined highly purified diatomite products of the present invention have reflected brightnesses of more than about 96% (usually in the range of about 96 to 100%), more preferably more than about 98% (usually in the range of about 98 to 100%), still more preferably more than about 99% (usually in the range of about 99 to 100%). The flux calcined highly purified diatomite products of the present invention have reflected brightnesses of more than about 95% (usually in the range of about 95 to 100%), more preferably more than about 97% (usually in the range of about 97 to 100%), still more preferably more than about 99% (usually in the range of about 99 to 100%).

5. Total Silica/Iron/Aluminum/Sodium Content

While the silica of diatomaceous earth is predominantly of an amorphous type that resembles mineral opal, crystalline quartz dust or sand is sometimes present which, although composed of silica, does not emulate the intricate and porous structure associated with diatomaceous earth or diatomite products. Upon calcination or flux calcination, products may be made in which diatomaceous earth particles are sintered together into larger agglomerated particles, thus modifying some of the properties of the diatomite products. Even after intense calcining, most diatomite products retain much of their intricate and porous structure, although conversion of amorphous hydrated silica to amorphous anhydrous silica, cryptocrystalline cristobalite, or cryptocrystalline quartz may result from such processing.

Highly accurate measurements of total silica content can be determined by using x-ray fluorescence spectrometry. This technique is also useful to determine the total content of other elements, such as aluminum, iron, and sodium.

In a preferred "fused tetraborate matrix" x-ray fluorescence method used to determine the total element contents of the highly purified products of the present invention, a 2 g diatomite sample (after roasting at 950° C. in air for 1 hr), is fused with 7.7 g of lithium tetraborate (i.e., $Li_2B_4O_7$), and the melt is cast into a 40 mm button. The button is analyzed on a Philips PW1600 simultaneous x-ray fluorescence spectrometer. This system was calibrated using more than 40 reference materials, most of which are tabulated in Govindaraju (1989). Counting time on major elements, such as silicon, aluminum, iron, or sodium, is 60 sec and each element is determined through its own fixed channel. Loss on ignition data are obtained from the roasting mentioned. To accommodate the natural loss of hydration within the silica structure, the total silicon, aluminum, iron, and sodium contents for all examples are reported on an ignited basis for their respective high oxides (i.e., $SiO_2$, $Al_2O_3$, $Fe_2O_3$, and $Na_2O$). As used herein, the term "on an ignited basis" reflects the pre-treatment of the sample by roasting at 950° C. in air for 1 hour prior to analysis.

In an alternative "pressed binder matrix" x-ray fluorescence method for determining total element content, a 3 g diatomite sample (after roasting at 950° C. in air for 1 hr) is added to 0.75 g of SPECTROBLEND (Registered Trademark, Chemplex) binder. The mixture is milled by shaking for 5 min in a tungsten carbide mixing vial with an impact ball. The resulting mixture is then pressed in a 31 mm die to 24,000 pounds per square inch (165 MPa) to form a pellet. Chemical composition is then determined using a Spectrace 6000 energy-dispersive x-ray fluorescence spectrometer operating under fundamental parameters, with calibration using six diatomite standards prepared in the same manner as samples. The instrument employs an electronically cooled Li(Si) detector and 50 kV rhodium target x-ray source, and is configured to result in sample excitation with approximately 50% deadtime. Peak intensities from spectra are analyzed by lineshape analysis comparison with single element reference spectra. Specifically, the $K_{alpha}$ peak intensities used for silicon, aluminum, and iron determinations correspond with energies of 1.740 keV, 1.487 keV, and 6.403 keV, respectively. The peak intensities for the diatomite standards are then converted into pure element count rates which are used for determining element contents in samples, by peak intensity and data fitting. This method achieves results that are comparable to the aforementioned method for all elements except sodium, for which the relative error is significantly greater than for the fused tetraborate matrix method.

The non-calcined highly purified diatomite products of the present invention have total silica contents of more than about 95% (w/w) $SiO_2$ (usually in the range of about 95 to about 99.9% (w/w) $SiO_2$); more preferably more than about 97% (w/w) $SiO_2$ (usually in the range of about 97 to about 99.9% (w/w) $SiO_2$); still more preferably more than about 98% (w/w) $SiO_2$ (usually in the range of about 98 to about 99.9% (w/w) $SiO_2$); yet more preferably more than about 99% (w/w) $SiO_2$ (usually in the range of about 99 to about 99.9% (w/w) $SiO_2$); reported on an ignited basis.

The calcined highly purified diatomite products of the present invention have total silica contents of more than about 98% (w/w) $SiO_2$ (usually in the range of about 98 to about 99.9% (w/w) $SiO_2$); more preferably more than about 99% (w/w) $SiO_2$ (usually in the range of about 99 to about 99.9% (w/w) $SiO_2$); reported on an ignited basis.

The flux calcined highly purified diatomite products of the present invention have total silica contents of more than about 92% (w/w) $SiO_2$ (usually in the range of about 92 to about 99.9% (w/w) $SiO_2$); more preferably more than about 94% (w/w) $SiO_2$ (usually in the range of about 94 to about 99.9% (w/w) $SiO_2$); still more preferably more than about 96% (w/w) $SiO_2$ (usually in the range of about 96 to about 99.9% (w/w) $SiO_2$); reported on an ignited basis.

The non-calcined, calcined, and flux calcined highly purified diatomite products of the present invention have total iron contents of less than about 0.3% (w/w) reported as $Fe_2O_3$ (usually in the range of about 0.005 to about 0.3% (w/w) $Fe_2O_3$), more preferably less than about 0.2% (w/w) $Fe_2O_3$, (usually in the range of about 0.005 to about 0.2% (w/w) $Fe_2O_3$), reported on an ignited basis.

The non-calcined, calcined, and flux calcined highly purified diatomite products of the present invention have total aluminum contents of less than about 0.5% (w/w) reported as $Al_2O_3$ (usually in the range of about 0.01 to about 0.5% (w/w) $Al_2O_3$), more preferably less than about 0.4% (w/w) $Al_2O_3$ (usually in the range of about 0.01 to about 0.4% (w/w) $Al_2O_3$), reported on an ignited basis.

6. Wet Density

An indicator of degree to which a diatomite product retains the porous and intricate structure unique to diatomite can be obtained by measuring its centrifuged wet density or settled wet density, or an equivalent measure of its packed density, since the magnitude of the density is limited by the packing arrangement that can be achieved. Wet density is critical because it reflects the void volume available to entrain particulate matter in a filtration process; it is one of the most important criteria to determine the filtration efficiency. Diatomite products with lower wet densities have greater void volumes, and thus greater filtration efficiency.

Convenient measurements of packed densities of diatomite powders are more reproducible in liquid media than in gases. The preferred method for determining the packed density of the highly purified products of the present invention is by measurement of the centrifuged wet density. If the sample to be tested is a non-calcined product, the sample should be dried to constant weight at 110° C. in air, and subsequently allowed to cool to room temperature in air (i.e., dried). If the sample to be tested is a calcined or flux calcined product, the sample should be dried to constant weight at room temperature in air. A sample of known weight between 0.50 and 1.00 g is placed in a calibrated 14 mL centrifuge tube, to which deionized water is added to make up a volume of approximately 10 mL. The mixture is shaken thoroughly until all of the sample is wetted and there is no dry powder remaining. Additional deionized water is added around the top of the centrifuge tube to rinse down any mixture adhering to the side of the tube from shaking. For calcined or flux calcined products, the tube is centrifuged (Beckman AccuSpin) for 3 min at 2700 rpm; for non-calcined (e.g., dried) products, the tube is centrifuged for an additional 6 min at 2700 rpm. Following centrifugation, the tube is carefully removed so as not to disturb the solids, and the level (i.e., volume) of the settled matter is measured to the nearest half of a 0.05 mL graduation on the tube. The centrifuged wet density of the known weight of powder is readily calculated by dividing the sample weight by the measured volume. Typically, centrifuged wet density is reported in units of $lb/ft^3$ or in units of $g/cm^3$; the conversion factor for these units is 1 $lb/ft^3$~0.01602 $g/cm^3$.

The non-calcined highly purified diatomite products of the present invention have centrifuged wet densities of less than about 0.28 $g/cm^3$ (usually in the range of about 0.15 to about 0.28 $g/cm^3$); more preferably less than about 0.27 $g/cm^3$ (usually in the range of about 0.15 to about 0.27 $g/cm^3$).

The calcined highly purified diatomite products of the present invention have centrifuged wet densities of less than about 0.28 $g/cm^3$ (usually in the range of about 0.10 to about 0.28 $g/cm^3$); more preferably less than about 0.25 $g/cm^3$ (usually in the range of about 0.10 to about 0.25 $g/cm^3$); still more preferably less than about 0.23 $g/cm^3$ (usually in the range of about 0.10 to about 0.23 $g/cm^3$); yet more preferably less than about 0.21 g/cm³ (usually in the range of about 0.10 to about 0.21 g/cm³).

The flux calcined highly purified diatomite products of the present invention have centrifuged wet densities of less than about 0.29 g/cm³ (usually in the range of about 0.10 to about 0.29 g/cm³); more preferably less than about 0.25 g/cm³ (usually in the range of about 0.10 to about 0.25 g/cm³); still more preferably less than about 0.23 g/cm³ (usually in the range of about 0.10 to about 0.23 g/cm³); yet more preferably less than about 0.21 g/cm³ (usually in the range of about 0.10 to about 0.21 g/cm³).

7. Silica Specific Volume

Under ideal circumstances, the most highly purified diatomite product is expected to have both a high total silica content and a low centrifuged wet density. This combination of properties often provides a measure of the usefulness of the purified product as compared to diatomite products of lesser purity. Impure diatomite is expected to have greater centrifuged wet density owing to the occupation of its porous, intricate structure with the impure substances. In order to quantify this combination of properties, the specific volume occupied by silica is defined by:

Silica Specific Volume=Fraction Silica Content/Centrifuged Wet Density, where the fraction silica content is calculated by dividing the percent by weight of $SiO_2$ on an ignited basis by 100, and the centrifuged wet density is expressed in units of grams per cubic centimeter (i.e., g/cm³). For example, for a sample with a measured total silica content of 99.1% (w/w) $SiO_2$ and a centrifuged wet density of 0.27 g/cm³, a silica specific volume of 0.991/0.27~3.7 is obtained. As is readily apparent from the equation, the greater the silica specific volume is, the greater the diatomite purity of the product will be.

The influence of both the content of total silica and packed density are accounted for in this simple expression. Even small changes in the total silica content or the centrifuged wet density result in significant changes of the silica specific volume, and the silica specific volume therefore provides a highly discriminating measure of diatomite product purity.

The non-calcined highly purified diatomite products of the present invention have silica specific volumes of more than about 3.5 (usually in the range of about 3.5 to about 7); more preferably more than about 3.6 (usually in the range of about 3.6 to about 7); still more preferably more than about 3.7 (usually in the range of about 3.7 to about 7).

The calcined highly purified diatomite products of the present invention have silica specific volumes of more than about 3.6 (usually in the range of about 3.6 to about 10); more preferably more than about 3.8 (usually in the range of about 3.8 to about 10); still more preferably more than about 4.0 (usually in the range of about 4.0 to about 10); yet more preferably more than about 4.5 (usually in the range of about 4.5 to about 10); still more preferably more than about 4.7 (usually in the range of about 4.7 to about 10).

The flux calcined highly purified diatomite products of the present invention have silica specific volumes of more than about 3.3 (usually in the range of about 3.3 to about 10); more preferably more than about 3.5 (usually in the range of about 3.5 to about 10); still more preferably more than about 4.0 (usually in the range of about 4.0 to about 10); yet more preferably more than about 5.0 (usually in the range of about 5.0 to about 10); still more preferably more than about 6.0 (usually in the range of about 6.0 to about 10).

8. Highly Purified Diatomite Products of the Present Invention

The non-calcined highly purified diatomite product of the present invention has a silica specific volume of more than about 3.5 (usually in the range of about 3.5 to about 7). More preferably, the product has a total silica content or more than about 95% (w/w) $SiO_2$ on an ignited basis (usually in the range of about 95 to about 99.9% (w/w) $SiO_2$), thus having a centrifuged wet density of less than about 0.28 g/cm³ (usually in the range of about 0.15 to about 0.28 g/cm³). The product retains the intricate and porous structure unique to diatomite, and as a permeability that is typically less than 0.1 Da (usually in the range of about 0.001 to about 0.1 Da). More preferably, the product has a total iron content of less than 0.3% (w/w) $Fe_2O_3$ on an ignited basis (usually in the range of about 0.005 to about 0.3% (w/w) $Fe_2O_3$), and a total aluminum content of less than 0.5% (w/w) $Al_2O_3$ (usually in the range of about 0.01 to about 0.5% (w/w) $Al_2O_3$), on an ignited basis. With respect to solubility, the product preferably has a specific resistance greater than 50 kΩ-cm (usually in the range of about 50 to about 250 kΩ-cm); a beer-soluble iron content less than 7 mg Fe/kg product (usually in the range of from about the quantitation limit to about 7 mg Fe/kg product); and a beer-soluble aluminum content less than 10 mg Al/kg product (usually in the range of from about the quantitation limit to about 10 mg Al/kg product).

The calcined highly purified diatomite product of the present invention has a silica specific volume of more than about 3.6 (usually in the range of about 3.6 to about 10). More preferably, the product has a total silica content of more than about 98% (w/w) $SiO_2$ on an ignited basis (usually in the range of about 98 to about 99.9% (w/w) $SiO_2$), thus having a centrifuged wet density of less than about 0.27 g/cm³ (usually in the range of about 0.10 to about 0.27 g/cm³). The product retains the intricate and porous structure unique to diatomite, and has a permeability that is in the range of about 0.05 to about 1.5 Da. Preferably, the product has a total iron content of less than 0.3% (w/w) $Fe_2O_3$ on an ignited basis (usually in the range of about 0.005 to about 0.3% (w/w) $Fe_2O_3$), and a total aluminum content of less than 0.5% (w/w) $Al_2O_3$ (usually in the range of about 0.01 to about 0.5% (w/w) $Al_2O_3$), on an ignited basis. With respect to solubility, the product preferably has a specific resistance greater than 80 kΩ-cm (usually in the range of about 80 to about 250 kΩ-cm); a beer-soluble iron content less than 7 mg Fe/kg product (usually in the range of from about the quantitation limit to about 7 mg Fe/kg product); and a beer-soluble aluminum content less than 10 mg Al/kg product (usually in the range of from about the quantitation limit to about 10 mg Al/kg product). The reflected blue light brightness of the product is preferably greater than 96%.

The flux calcined highly purified diatomite product of the present invention has a silica specific volume of more than about 3.3 (usually in the range of about 3.3 to about 10). More preferably, the product has a total silica content or more than about 92% (w/w) $SiO_2$ on an ignited basis (usually in the range of about 92 to about 98% (w/w) $SiO_2$), thus having a centrifuged wet density of less than about 0.29 g/cm³ (usually in the range of about 0.10 to about 0.29 g/cm³). The product retains the intricate and porous structure unique to diatomite, and as a permeability of more than about 1 Da (usually in the range of about 1 to about 50 Da). Preferably, the product has a total iron content of less than 0.3% (w/w) $Fe_2O_3$ on an ignited basis (usually in the range of about 0.005 to about 0.3% (w/w) $Fe_2O_3$), and a total aluminum content of less than 0.5% (w/w) $Al_2O_3$ (usually in the range of about 0.01 to about 0.5% (w/w) $Al_2O_3$), on an ignited basis. With respect to solubility, the product preferably has a beer-soluble iron content less than 7 mg Fe/kg product (usually in the range of from about the quantitation limit to about 7 mg Fe/kg product); and a beer-soluble aluminum content less than 10 mg Al/kg product (usually in the range of from about the quantitation limit to about 10 mg Al/kg product). The reflected blue light brightness of the product is preferably greater than 95%.

9. Comparison of the Highly Purified Diatomite Products of the Present Invention with Known Diatomite Products Much effort to improve low grade diatomaceous earths into higher grade ores has resulted in diatomite products essentially equivalent in their overall quality to commercial products obtained from naturally better ores. Examples of such work includes that of Norman and Ralston (1940), Bartuska and Kalina (1968a, 1968b), Visman and Picard (1972), Tarhanic and Kortisova (1979), Xiao (1987), Li (1989), Liang (1990), Zhong et al. (1991), Brozek et al. (1992), Wang (1992), Cai et al. (1992), and Videnov et al. (1993). None of the products obtained from these efforts approach the unique combination of the properties of the highly purified diatomite products of the present invention.

Of greater relevance are several diatomite products that have been prepared with a single property targeted for improvement, since these products have been designed to obtain uniqueness. For example, Thomson and Barr (1907), Barr (1907), Vereinigte (1913, 1928), Koech (1927), Swallen (1950), Suzuki and Tomizawa (1971), Bradley and McAdam (1979), Nielsen and Vogelsang (1979), Heyse and Feigl (1980), and Mitsui et al. (1989) focussed on products with reduced total iron or soluble iron content alone, with only marginal improvements reported for other salient properties, if any. A diatomite product made by Baly (1939) had low organic matter, and Codolini (1953), Pesce (1955, 1959), Martin and Goodbue (1968), and Munn (1970) made diatomite products with relatively high brightness but, again, other important properties were not reported to be affected.

In some instances, diatomite products have been prepared for which more than one property has been improved upon and reported. A diatomite product made by Enzinger (1901) reduced conventional solubility at that time. Diatomite products made by Bregar (1955), Gruder et al. (1958), and Nishamura (1958) were brighter, coupled with a lower total iron content. A product made by Smith (1991a,b,c; 1992a, b,c; 1993; 1994a,b) improved on the soluble multivalent cations of a flux calcined diatomite product. In all of these cases, other important properties were not reported to be affected.

A product made by Schuetz (1935) resulted in a relatively high total silica content of 94.6% $SiO_2$ and a total iron content of 0.5% $Fe_2O_3$, but the total aluminum content of the product was still 2.5% $Al_2O_3$. While Filho and Mariz da Veiga (1980) achieved low content of total aluminum at 0.28% $Al_2O_3$ and total iron at 0.31% $Fe_2O_3$, a total silica content of only 92.6% $SiO_2$ and a residual loss on ignition of 1.3% indicates that the diatomite product was still impure.

Products with interesting properties, including total silica content of up to 98.5% $SiO_2$, total iron content as low as 0.06% $Fe_2O_3$, and total aluminum content as low as 0.36% $Al_2O_3$ were prepared by Marcus and Creanga (1965), and Marcus (1967), from starting materials whose silica composition was a mixture of approximately 65% diatomite, 30% quartz, and 5% combined silicates. The actual concentrations of crystalline quartz remaining in products were not reported, but any residual crystalline quartz would be included in the total silica content, thus partially depriving the products of the full benefits obtained from the intricate and porous structure of diatomite. The high wet densities reported for the products (not less than 0.43 g/cm$^3$) corroborate that a significant part of the total silica content reported was nondiatomaceous silica. The highest value of silica specific volume calculated for their products is 2.3, which clearly indicates a diatomite of low utility and quality. In fact, these products have densities that are significantly greater than those of commercial diatomite products, and are therefore unattractive or altogether unsuitable for use in the principal applications of diatomite products. In addition, residual aluminum and iron solubility data that are critical to many diatomite product applications are not reported by Marcus and Creanga (1965), and Marcus (1967).

B. Methods of Preparing the Highly Purified Biogenic Silica Products

1. Methods of Preparing Non-Calcined Product

The highly purified diatomite products of the present invention can be prepared using the following sequence of processing steps, performed in order: (i) attrition milling, (ii) hydrocycloning, (iii) flotation, and optionally (iv) leaching. Subsequent processing steps, such as calcining or flux calcining may also be used.

In a typical method, crude ores of diatomaceous earth are crushed to a size that can be further reduced by milling to pass through a coarse screen mesh. Water is added to the ore, and the mixture subjected to wet attrition milling to obtain a uniform slurry of particles that are passed through a fine screen mesh. The slurry is introduced to a hydrocyclone that has been configured to produce an overflow consisting of particles with a much smaller median particle size, effectively separating heavier mineral contaminants (into the hydrocyclone underflow) from the diatomite (into the hydrocyclone overflow). The hydrocyclone overflow is charged to a reverse flotation process in which contaminants are concentrated in the froth under selective conditions (e.g., pH, solids concentration, etc.) in which a collector (e.g., a fatty amine) has been added to enhance concentration and removal of impurities, while the enriched diatomite fraction is separated and recovered. To improve the purification, the enriched diatomite fraction is leached in appropriate media and under specific conditions (e.g., acid treatment) to further remove contaminant residues, and then thoroughly rinsed with deionized water. At this point, the highly purified diatomite is dewatered, consolidated, and dried.

A preferred method for the preparation of the non-calcined highly purified diatomite product of the present invention, and the properties of the resulting product, is illustrated in Example 1, below.

2. Methods of Preparing Calcined Products

The non-calcined highly purified diatomite product can be further purified by calcining, to yield a calcined product. Calcining conditions and methods are usually selected to yield the degree of sintering and agglomeration of diatomite particles needed to result in a particular product flow rate. Calcining can be effected over a range of temperatures, certainly above the ~110° C. required for drying at atmospheric pressure, and usually greater than about 300° C. up to about 1300° C., with a suitable retention time, usually between 2 min and 120 min, depending on the equipment used for calcination. Calcination is usually performed in air, or in air enriched in oxygen (i.e., $O_2$), or in air enriched in combustion gases, for example, carbon monoxide (i.e., CO) or carbon dioxide (i.e., $CO_2$), although calcining in other atmospheres is possible. Calcining can be effected by static means, for example, using a muffle furnace, tunnel kiln, or envelope kiln, or by dynamic means, for example, using a rotary kiln or a fluidized bed apparatus. Calcination is a highly flexible method to make diatomite filter aids having diverse flow rate permeabilities, usually within the range of 0.05 to 1.5 Da.

A preferred method for the preparation of the calcined highly purified diatomite product of the present invention, and the properties of the resulting product, is illustrated in Example 2, below.

3. Methods of Preparing Flux Calcined Products

The non-calcined highly purified diatomite product can be further purified and agglomerated by calcining in the presence of a flux, to yield a flux calcined product. The calcining conditions and methods described above are also suitable for flux calcining. In general, the presence of a flux during calcination reduces the temperature at which sintering and agglomeration of diatomite particles occurs, thus permitting larger agglomerates to form and extending the permeability range of filter aids up to about 50 Da. Suitable fluxes include salts of the alkali metal Group IA in the periodic table, especially those derived from sodium (i.e., Na). Examples of the most useful fluxes used in practice are sodium carbonate (i.e., soda ash; $Na_2CO_3$), sodium hydroxide (i.e., NaOH), and sodium chloride (i.e., NaCl).

A preferred method for the preparation of the flux calcined highly purified diatomite product of the present invention, and the properties of the resulting product, is illustrated in Example 3, below.

4. Further Modifications of the Products

Further modifications of the highly purified diatomite products are also possible. For example, the purified product can be further processed to enhance one or more particular properties of the highly purified product (for example, impurity solubility, total silica content, centrifuged wet density, or brightness), or to yield a new product with a specialized use.

a. Acid Washing

Another class of products can be prepared from non-calcined, calcined, or flux calcined highly purified diatomite products described above by washing with an acidic substance, followed by rinsing with deionized water to remove residual acid, and subsequent drying. Suitable acids include mineral acids, for example, sulfuric acid (i.e., $H_2SO_4$), hydrochloric acid (i.e., HCl), phosphoric acid (i.e., $H_3PO_4$), or nitric acid (i.e., $HNO_3$), as well as organic acids, for example, citric acid (i.e., $C_6H_8O_7$) or acetic acid (i.e., $CH_3COOH$).

b. Surface Treatment

Another class of products can be prepared by treatment of the surface of the non-calcined, calcined, or flux calcined highly purified diatomite products described above. For example, the product's surface may be modified, for example, by silanization, to render the surface either more hydrophobic or more hydrophilic.

For example, the highly purified diatomite product can be placed in a plastic vessel, and a small quantity of dimethyldichlorosilane (i.e., $SiCl_2(CH_3)_2$) or hexamethyldisilazane (i.e., $(CH_3)_3Si—NH—Si(CH_3)_3$) added to the vessel. Reaction is allowed to take place at the surface in the vapor phase over a 24 hr period, resulting in more hydrophobic products. Such products have application in compositions used in chromatography, and also when used in conjunction with other hydrophobic materials for improved mechanical performance, for example, in applications involving hydrocarbons and oils.

Similarly, the highly purified diatomite product can be reacted, for example, by suspending it in a solution containing 10% (w/v) aminopropyltriethoxysilane (i.e., $C_9H_{23}NO_3Si$) in water, refluxing at 70° C. for 3 hr, filtering the mixture, and drying the remaining solids to obtain more hydrophilic products. Such products have applications in compositions used in chromatography, when used in conjunction with aqueous systems for improved mechanical performance, and to permit further derivatization of the product, having converted terminal hydroxyl (i.e., —OH) functional groups of the highly purified diatomite product surface to aminopropyl groups (i.e., —$(CH_2)_3NH_2$).

c. Organic Derivatization

The hydrophilic (e.g., silanized) modified highly purified diatomite products can further be reacted to bind an organic compound, for example, a protein; the diatomite product thereby serves as a support for the immobilization of organic compound. So modified, the product has utility in applications such as affinity chromatography and biochemical purification.

A number of other reactions pertaining to derivatization of diatomite products have been previously described (Hermanson, 1992). However, derivatization of the highly purified diatomite products of the present invention, which offer a unique combination of properties such as high purity and low density, yields modified products with substantially superior efficacy.

Obviously, many other modifications and variations of the invention as hereinbefore set forth can be made without departing from the spirit and scope thereof and therefore only such limitations should be imposed as are indicated by the appended claims.

C. Methods of Using the Highly Purified Biogenic Silica Products

The highly purified diatomite products of the present invention, and their further modifications, are useful in the processing, treatment, or formulation of other materials.

In filtration, the highly purified diatomite products of the present invention, and their further modifications, can be applied to a septum to improve clarity and increase flow rate in filtration processes, or added directly to a fluid as it is being filtered to reduce the loading of undesirable particulate at the septum. The products can be used in conjunction with other media during filtration, for example, cellulose, activated charcoal, clay, or other materials. The products can also be used in preparing composites, being intimately compounded with other ingredients to make sheets, pads, or cartridges. The appropriate selection of which modification of the highly purified diatomite products is preferred is determined by the specific application. For example, in a filtration process that demands exceptional clarity but tolerates slower flow rate, a highly purified diatomite product of the non-calcined or calcined classes may be preferred. Alternatively, in a filtration process that demands high flow rate but does not require exceptional clarity, a highly purified diatomite product of the flux calcined class may be preferred. Similar reasoning applies to use of the highly purified diatomite products when used in conjunction with other materials, or when preparing composite materials containing the product. The quantity of product which is used is similarly determined by the specific process to which it is applied.

Use of the highly purified diatomite products as functional fillers, for example, in paints and coatings, or in polymers, is usually accomplished by direct addition into the formulation at a concentration needed for the desired effect. Both the flatting property of the products in paints and coatings as well as the antiblock property of the products in polymers are derived from the irregular surface provided by the porous, intricate structure of diatomite.

The silanized hydrophobic or hydrophilic products are desirable when these properties further improve the filtration or functional filler performance, owing to their greater compatibility with other materials or ingredients in a specific application. The alteration of surface characteristics through silanization is especially critical to chromatographic applications, as these characteristics strongly influence the effectiveness of chromatographic separations for specific systems. For example, hydrophobic surfaces on a chromatographic support reduce surface activity of the support and reduce tailing to a considerable degree when used for the analytical determination of many organic compounds, such as pesticides.

The products are also desirable for further organic derivatizations, such as the coupling of a protein to an aminosilanized support. For example, protein A, a polypeptide derived from a bacterial source, has been coupled to an aminosilanized diatomite-based support for use in clinical treatment of immunologic disorders (Jones, 1992).

The highly purified products of the present invention, and their further modifications, are useful in numerous other applications.

D. EXAMPLES

Several highly purified diatomite products of the present invention, and methods for preparing them, are described in the following examples, which are offered by way of illustration and not by way of limitation.

Example 1

Highly Purified Biogenic Silica Product (Non-Calcined)

A crude ore of diatomaceous earth was crushed and hammer milled to pass through a 12 mesh screen (i.e., with openings of approximately 1.82 mm), slurried with water to a pulp density of 20 to 23% solids, and then attrition milled to pass through a 100 mesh screen (i.e., with openings of approximately 174 $\mu$m). The slurry was diluted to 8 to 10% solids with water, and introduced to a 1 inch (2.5 cm) hydrocyclone operated at a pressure of 50 to 60 pounds per square inch (345 to 414 kPa). The overflow fraction contained particles with a median particle size of 10 to 12 $\mu$m. A collector was prepared by dissolving equal volumes of tripentylamine (i.e., $N(C_5H_{11})_3$) in acetic acid (i.e., $CH_3COOH$) prior to addition. In a preconditioning step, the pH of the diatomite overflow was adjusted to within a desired range of pH 3 to 5 using sulfuric acid (i.e., $H_2SO_4$), and sufficient tripentylamine solution was added to deliver 360 to 390 g of tripentylamine per 1000 kg of solids. Mechanical flotation was then effected in two stages, a rougher stage and a scavenger stage. The diatomite flotation product from the second scavenger stage was recirculated in combination with hydrocyclone overflow teed to the first rougher stage flotation, with a sufficient quantity of tripentylamine solution delivered directly to the flotation cells to add a 240 to 260 g supplement of tripentylamine per 1000 kg of solids. The overall flotation process was adjusted to provide a 60 to 65% yield of flotation product. The flotation product was then thickened to a pulp density of 10% solids using 600 g of SuperFloc 127 Plus (Cytec, a polyacrylamide (i.e., $[CH—CH(CONH_2)]_n$) flocculent) per 1000 kg of solids, then leached for 2 hr with 2 N sulfuric acid (i.e., $H_2SO_4$) maintained at a temperature of 90 to 95° C. The slurry was dewatered with a pressure filter, the cake rinsed with deionized water to obtain a minimum rinse water specific resistance of 250 k$\Omega$-cm, and then dried to constant weight at 110° C. in air in an oven.

Upon ultimate analysis, the non-calcined product of this example of the present invention was found to have a total silica content of 99.1 % (w/w) $SiO_2$, found on an ignited basis, as determined by x-ray fluorescence using the fused tetraborate matrix method. The product further had a total aluminum content of 0.31 % (w/w) reported as $Al_2O_3$, and a total iron content of 0.15% (w/w) reported as $Fe_2O_3$, as determined by x-ray fluorescence using the fused tetraborate matrix method. Its centrifuged wet density was 0.27 g/cm$^3$. From this information, the silica specific volume for this product calculates to be 3.7, which exceeds that of any product in its class of non-calcined diatomite products. See, for example, Table 1, Example 1.

The product of this example had a beer-soluble iron content of less than 5 mg Fe/kg product, a beer-soluble aluminum content of less than 8 mg Al/kg product, and a specific resistance of 62 k$\Omega$-cm, further attesting to its purity.

Example 2

Highly Purified Biogenic Silica Product (Calcined)

The product from Example 1, above, was subsequently milled to slightly reduce the median particle size by 1 $\mu$m, and calcined in air at a temperature of 2150° F. ($\approx$1175° C.) with a 40 min retention time. The material was then dispersed in air, allowed to cool to room temperature in a humid environment, and classified by screening to result in a permeability within the range of a conventional calcined product of approximately 0.3 Da.

Upon ultimate analysis, the calcined product of this example of the present invention was found to have a total silica content of 99.6% (w/w) $SiO_2$ with negligible loss on ignition, as determined by x-ray-fluorescence using the fused tetraborate matrix method. The product had a total aluminum content of 0.31% (w/w) reported as $Al_2O_3$, and a total iron content of 0.09% (w/w) reported as $Fe_2O_3$, as determined by x-ray fluorescence using the fused tetraborate matrix method. Its centrifuged wet density was 0.21 g/cm$^3$. From this information, the silica specific volume for this product calculates to be 4.7, which exceeds that of any product in its class of calcined diatomite products. See, for example, Table 1, Example 2.

The product of this example had a beer-soluble iron content of less than 5 mg Fe/kg product, a beer-soluble aluminum content of less than 8 mg Al/kg product, and a specific resistance of 140 k$\Omega$-cm, further attesting to its great purity. The product also had a measured reflected brightness in blue light of 100%.

Example 3

Highly Purified Biogenic Silica Product (Flux Calcined)

The product from Example 1, above, was subsequently flux calcined in air at a temperature of 2150° F. ($\approx$1175° C.) with a retention time of 40 min in the presence of approximately 3% (w/w) powdered anhydrous sodium carbonate (i.e., $Na_2CO_3$) added as a flux. The material was allowed to cool to room temperature in a humid environment, then dispersed in air and classified by screening to result in a permeability within the range of a conventional flux calcined diatomite product of approximately 1.2 Da.

Upon ultimate analysis, the flux calcined product of this example of the present invention was reported to have a total silica content of 96.8% (w/w) $SiO_2$ with a negligible loss on ignition, and a measured total sodium content of 1.50% (w/w) reported as $Na_2O$, as determined by x-ray fluorescence using the fused tetraborate matrix method. The product had a total aluminum content of 0.40% (w/w) reported as $Al_2O_3$, and a total iron content of 0.11% (w/w) reported as $Fe_2O_3$, also determined by x-ray fluorescence using the fused tetraborate matrix method. Its centrifuged wet density was 0.16 g/cm$^3$. From this information, the silica specific volume for this product calculates to be 6.1, which exceeds that of any product in its class of flux calcined products. See, for example, Table 1, Example 3.

The product of this example had a beer-soluble iron content of less than 5 mg Fe/kg product, a beer-soluble aluminum content of less than 8 mg Al/kg product, further attesting to its great purity. The product also had a measured reflected brightness in blue light of 99%.

Diatomite products that are commonly available commercially have the properties shown in Table 1, as described by CR Minerals Corporation (not dated), CECA S. A. (1988), Celite Corporation (1991a, 1991b), Eagle-Picher Minerals, Inc: (1988), Grefco, Inc. (1990), and Showa Chemical Industry Co., Ltd. (1995). These known products are compared in Table 1 with the highly purified products of the present invention described in the foregoing examples.

TABLE 1

Comparison of Purified Diatomite Products with Commercial Products
(n.a. means "not available")

Part A.

|  | % $SiO_2$ | % $Al_2O_3$ | % $Fe_2O_3$ |
|---|---|---|---|
| Purified Product (Example 1) | 99.1 | 0.3 | 0.2 |
| CR Minerals DiaFil Natural[1] | 93.0 | 3.0 | 1.3 |
| Celite Natural[2] | 85.8 | 3.8 | 1.2 |
| Celatom Natural[3] | 89.2 | 4.0 | 1.5 |
| Radiolite Natural[4] | 80.8 | 8.1 | 1.6 |
| Purified Product (Example 2) | 99.6 | 0.3 | 0.1 |
| Celite Analytical Filter Aid[5] | 97.5 | 1.3 | 0.2 |
| Celite Calcined, Acid Washed[5] | 92.6 | 3.4 | 1.3 |
| Celite Calcined[2] | 91.5 | 4.0 | 1.1 |
| Celatom Calcined[3] | 92.8 | 4.2 | 1.6 |
| CECA Calcined[6] | 89. | 4.8 | 3.3 |
| Dicalite Calcined[7] | n.a. | n.a. | n.a. |
| Radiolite Calcined[4] | 90.4 | 6.2 | 1.2 |
| Purified Product (Example 3) | 96.8 | 0.4 | 0.1 |
| Celite Flux Calcined, Acid Washed[5] | 89.4 | 3.4 | 1.3 |
| Celite Flux Calcined[2] | 89.6 | 4.0 | 1.3 |
| Celatom Flux Calcined[3] | 89.5 | 4.1 | 1.5 |
| CECA Flux Calcined[6] | 87.8 | 3.4 | 2.4 |
| Dicalite Flux Calcined[7] | n.a. | n.a. | n.a. |
| Radiolite Flux Calcined[4] | 89.2 | 5.2 | 1.3 |

Part B.

| | Centrifuged or Settled Wet Density | |
|---|---|---|
| | (pounds per cubic foot) | (grams per cubic centimeter) |
| Purified Product (Example 1) | 17 | 0.27 |
| CR Minerals DiaFil Natural[1] | 19 | (0.30) |
| Celite Natural[2] | 16 | (0.26) |
| Celatom Natural[3] | 21 | (0.34) |
| Radiolite Natural[4] | n.a. | n.a. |
| Purified Product (Example 2) | 13 | 0.21 |
| Celite Analytical Filter Aid[5] | n.a. | (0.29) |
| Celite Calcined, Acid Washed[5] | n.a. | n.a. |
| Celite Calcined[2] | 18 | (0.29) |
| Celatom Calcined[3] | 23 | (0.37) |
| CECA Calcined[6] | (16) | 0.26 |
| Dicalite Calcined[7] | 23 | 0.37 |
| Radiolite Calcined[4] | (17) | 0.27 |
| Purified Product (Example 3) | 10 | 0.16 |
| Celite Flux Calcined, Acid Washed[5] | n.a. | n.a. |
| Celite Flux Calcined[2] | 18 | (0.29) |
| Celatom Flux Calcined[3] | 19 | (0.30) |
| CECA Flux Calcined[6] | (18) | 0.29 |
| Dicalite Flux Calcined[7] | 20 | 0.32 |
| Radiolite Flux Calcined[4] | (20) | 0.32 |

Part C.

| | Silica Specific Volume (Calculated) |
|---|---|
| Purified Product (Example 1) | 3.7 |
| CR Minerals DiaFil Natural[1] | 3.1 |
| Celite Natural[2] | 3.3 |
| Celatom Natural[3] | 2.6 |
| Purified Product (Example 2) | 4.7 |
| Celite Analytical Filter Aid[5] | 3.4 |
| Celite Calcined[2] | 3.2 |
| Celatom Calcined[3] | 2.5 |
| CECA Calcined[6] | 3.4 |
| Radiolite Calcined[4] | 3.3 |
| Purified Product (Example 3) | 6.1 |
| Celite Flux Calcined[2] | 3.1 |
| Celatom Flux Calcined[3] | 3.0 |
| CECA Flux Calcined[6] | 3.0 |
| Radiolite Flux Calcined[4] | 2.8 |

Note:
Tabulated data in parentheses have been calculated from published data except in the case of Celite Analytical Filter Aid, in which it represents the average value obtained from production lots.
[1]CR Minerals Corporation, "DiaFil" Publication (no date).
[2]Celite Corporation, Publication FA 84 (1991).
[3]Eagle-Picher Minerals, Inc., Publication Form A-550 (1988).
[4]Showa Chemical Industry Co., Ltd, Publication 95.1.2000(3) (1995).
[5]Celite Corporation, Publication FA 488 (1991).
[6]CECA S.A., Untitled Publication (1988).
[7]Grefco, Inc., Filtration Bulletin B-16 (1990).

Figure 2:
FIG. 2 is a scanning electron photomicrograph of the calcined highly purified diatomite product of Example 2.

The silica specific volume data found in Table 1, Part C are graphically illustrated by the bar graph in FIG. 1. As can be readily seen, the highly purified product examples of the present invention exceed the silica specific volume for conventional products in every product class. In addition, a photomicrograph of the highly purified calcined product of the present invention, shown in the accompanying FIG. 2, demonstrates that the purified diatomite products of the present invention retain the intricate and porous structure characteristic of diatomite.

E. References

The disclosures of the publications, patents, and published patent specifications referenced below are hereby incorporated by reference into the present disclosure to more fully describe the state of the art to which this invention pertains.

Baly, E. C. C. et al. (1939), Trans. Faraday Soc. 35:1165–1175.

Barr, J. (1907), French Patent 377,086.

Bartuska, M. and Kalina, J. (1968a), Czech. Patent 128,699.

Bartuska, M. and Kalina, J. (1968b), Czech. Patent 128,894.

Bear, J. (1988), *Dynamics of Fluids in Porous Media* (New York: Dover Publications, Inc.), 161–176.

Bradley, T. G. and McAdam, R. L. (1979), U.S. Pat. No. 4,134,857.

Breese, R. (1994), in *Industrial Minerals and Rocks*, 6th ed., (Littleton, Co.:

Society for Mining, Metallurgy, and Exploration); 397–412.
Bregar, G. W. (1955), U.S. Pat. No. 2,701,240.
Brozek, M. et al. (1992), *Przegi. Gorn.* 48(7):16–20.
Cai, H. et al. (1992), *Kuangchan Zonghe Liyong* 1992(6):1–8.
Codolini, L. (1953), Italian Patent 487,158.
Cummins, A. B. (1933), U.S. Pat. No. 1,934,410.
Dufour, P. (1990), French Patent 9,007,690.
Dufour, P. (1993), U.S. Pat. No. 5,179,062.
Engh, K. R. (1994), in *Kirk-Othmer Encyclopedia of Chemical Technology,* 4th ed.,
vol. 8 (New York: John Wiley & Sons);108–118.
Enzinger, K. (1901), U.S. Pat. No. 665,652.
Filho, F. X. H. et al. (1980), *Mineracã Metalurgia* 44(424):14–21.
Gordienko, V. F. (1941), Russian Patent 59,337 (1941).
Govindaraju, K. (July, 1989), *Geostandards Newsletter,* Vol. XIII.
Gruder, G. et al. (1958), *Rev. Chim. (Bucharest)* 9:361–366.
Hermanson, G. T. et al. (1992), *Immobilized Affinity Ligand Techniques* (San Diego: Academic Press Inc.).
Heyse, K. U. et al. (1980), *Brauwissenschaft* 33:137–143.
Jones, F. R. (1992), U.S. Pat. No. 5,122,112.
Kasama, K. and Ida, T. (1958), Japanese Patent 10,780.
Kiefer, J. (1991), *Brauwelt International,* IV/1991; 300–309.
Kieselguhr-Industrie G.m.b.H. (1942), German Patent 730,034.
Koech, R. (1927), German Patent 469,606.
Kouloheris, A. P. (1971), U.S. Pat. No. 3,572,500.
Li, F. (1990), *Feijinshukang* 1989(3):27–28, 43.
Liang, C., et al. (1990), Chinese Patent 1,044,233.
Marcus, D. et al. (1964), *Rev. Chim. (Bucharest)* 15(11):671–674.
Marcus, D. (1967), *Rev. Chim. (Bucharest)* 18(6):332–335.
Martin, C. C. and Goodbue, D. T. (1968), U.S. Pat. No. 3,375,922.
Mitsui, Y., et al. (1989), Japanese Patent 01-153564.
Munn, D. R. (1970), U.S. Pat. No. 3,547,260.
Nielsen, R. B. and Vogelsang, C. J. (1979), U.S. Pat. No. 4,142,968.
Nishimura, Y. (1958), Japanese Patent 4,414.
Norman, J. et al. (1940), *Mining Technology* May 1940, 1–11.
Olmsted, Jr., B. C. (1982), U.S. Pat. No. 4,324,844.
Pesce, L. (1955), Italian Patent 529,036.
Pesce, L. (1959), German Patent 1,052,964.
Schrauf, R. and Frey, A. (1957), German Patent 1,005,048.
Schuetz, C. C. (1935), U.S. Pat. No. 1,992,547.
Smith, T. R. (1991a), U.S. Pat. No. 5,009,906.
Smith, T. R. (1991 b), Canadian Patent 2,044,868.
Smith, T. R. (1991c), Danish Patent 9,101,179.
Smith, T. R. (1992a), German Patent 4,120,242.
Smith, T. R. (1992b), Dutch Patent 9,101,957.
Smith, T. R. (1992c), Brazilian Patent 9,102,509.
Smith, T. R. (1993), Australian Patent 638,655.
Smith, T. R. (1994a), U.K. Patent 2,245,265.
Smith, T. R. (1994b), Japanese Patent 6-315368.
Suzuki, T., and Tomizawa, T. (1971), Japanese Patent 46-7563.
Swallen, L. C. (1950), U.S. Pat. No. 2,504,347.
Tarhanic, L. et al. (1979), *Geol. Pruzkum* 21(5):140–142.
Thomson, W. and Barr. J. (1907), U.K. Patent 5397.
Vereiningte Deutsche Kieselguhrwerke G.m.b.H. (1915), German Patent 286,240.
Vereinigte Stahiwerke A.-G. (1931), U.K. Patent 341,060.
Videnov, N. et al. (1993), *Inter. J. Miner. Process.* 39:291–298.
Visman, J., and Picard, J. L. (1972), Canadian Patent 890,249.
Wang, S. (1992), *Feijinshukang* 1992(3):10–13.
Williams, R. C. (1926), U.S. Pat. No. 1,606,281.
Xiao, S. (1986), Chinese Application 86-107500.
Zaklac Elektro Spolka z Organiczona Poreka (1933), German Patent 570,015.
Zhong, S., et al. (1991), Chinese Patent 1,053,564.
Analytica-EBC of the European Brewery Convention, 4th ed. (1987; Zurich: Braureiund Getränke-Rundschau); E255–E258.
CECA S. A., Untitled Publication (1988).
Celite Corporation, Publication FA 488 (1991).
Celite Corporation, Publication FA 84 (1991).
CR Minerals Corporation, "Diafil®" (no date).
Eagle-Picher Minerals, Inc., Publication Form A-550 (1988).
Grefco, Inc., Filtration Bulletin B-16 (1990).
Methods of Analysis of the American Society of Brewing Chemists (1987).
Showa Chemical Industry Co., Ltd., Publication 95.1.2000 (3) (1995).

What is claimed is:

1. A highly purified diatomite product having an intricate and porous diatomaceous silica structure, said product selected from the group of consisting of:
    a non-calcined product having a silica specific volume greater than 3.5;
    a calcined product having a silica specific volume greater than 3.6; and
    a flux calcined product having a silica specific volume greater than 3.3.

2. The product of claim 1, wherein:
    said non-calcined product has a total silica content of greater than 95% (w/w) $SiO_2$ on an ignited basis;
    said calcined product has a total silica content of greater than 98% (w/w) $SiO_2$ on an ignited basis; and,
    said flux calcined product has a total silica content of greater than 92% (w/w) $SiO_2$ on an ignited basis.

3. The product of claim 1, said product having a beer-soluble aluminum content of less than 10 mg Al/kg product.

4. The product of claim 1, said product having a beer-soluble iron content of less than 7 mg Fe/kg product.

5. A highly purified non-calcined diatomite product having an intricate and porous diatomaceous silica structure, said product having a silica specific volume greater than 3.5.

6. The non-calcined product of claim 5, said product having a total silica content of greater than 95% (w/w) $SiO_2$ on an ignited basis.

7. The non-calcined product of claim 5, said product having a beer-soluble aluminum content of less than 10 mg Al/kg product.

8. The non-calcined product of claim 5, said product having a beer-soluble iron content of less than 7 mg Fe/kg product.

9. The non-calcined product of claim 5, said product having a specific resistance greater than 50 kΩ-cm.

10. A highly purified calcined diatomite product having an intricate and porous diatomaceous silica structure, said product having a silica specific volume greater than 3.6.

11. The calcined product of claim 10, said product having a total silica content of greater than 98% (w/w) $SiO_2$ on an ignited basis.

12. The calcined product of claim 10, said product having a beer-soluble aluminum content of less than 10 mg Al/kg product.

13. The calcined product of claim 10, said product having a beer-soluble iron content of less than 7 mg Fe/kg product.

14. The calcined product of claim 10, said product having a specific resistance greater than 80 kΩ-cm.

15. The calcined product of claim 10, said product having a blue light reflected brightness of greater than 96%.

16. A highly purified flux calcined diatomite product having an intricate and porous diatomaceous silica structure, said product having a silica specific volume greater than 3.3.

17. The flux calcined product of claim 16, said product having a total silica content of greater than 92% (w/w) $SiO_2$ on an ignited basis.

18. The flux calcined product of claim 16, said product having a beer-soluble aluminum content of less than 10 mg Al/kg product.

19. The flux calcined product of claim 16, said product having a beer-soluble iron content of less than 7 mg Fe/kg product.

20. The flux calcined product of claim 16, said product having a blue light reflected brightness of greater than 95%.

21. The flux calcined product of claim 16, said product having a combined total sodium ($Na_2O$) content and total silica ($SiO_2$) content of greater than 98% (w/w) on an ignited basis.

22. A highly purified diatomite product having an intricate and porous diatomaceous silica structure, said product having a blue light reflected brightness greater than 99%.

* * * * *